US006145563A

United States Patent [19]

Kalisiak et al.

[11] Patent Number: 6,145,563

[45] Date of Patent: Nov. 14, 2000

[54] VERTICAL PRESSURE SEALER APPARATUS

[75] Inventors: Michael S. Kalisiak, North Tonawanda; Rebecca L. Parker; Richard S. Downing, both of Grand Island; Daniel F. Pustelnik, West Seneca; John Van de Ven, Grand Island; David G. Wagner, West Amherst, all of N.Y.

[73] Assignee: Moore Business Forms, Inc., Grand Island, N.Y.

[21] Appl. No.: 08/266,558

[22] Filed: Jun. 28, 1994

[51] Int. Cl.[7] .............................. B32B 35/00; B43M 5/04

[52] U.S. Cl. .......................... 156/555; 156/290; 156/580; 100/153

[58] Field of Search .................................... 156/555, 290, 156/291, 292, 479, 548, 553, 556, 582, 580; 100/153, 175, 93 RP; 271/184, 185, 186, 226, 225

[56] References Cited

U.S. PATENT DOCUMENTS

| | | | |
|---|---|---|---|
| 426,728 | 4/1890 | Maret . | |
| 891,701 | 6/1908 | Jennings . | |
| 2,190,413 | 2/1940 | Davidson | 271/49 |
| 2,234,223 | 3/1941 | Ball | 26/63 |
| 2,331,054 | 10/1943 | Shively | 156/209 |
| 2,362,819 | 11/1944 | Hinchey . | |
| 2,627,893 | 2/1953 | Williams . | |
| 2,730,161 | 1/1956 | Langer . | |
| 2,770,936 | 11/1956 | Clark | 53/180 |
| 2,893,468 | 7/1959 | Fieroh . | |
| 2,944,587 | 7/1960 | Newcomb . | |
| 2,961,291 | 11/1960 | Pickett et al. . | |
| 3,006,257 | 10/1961 | Orsini . | |
| 3,068,933 | 12/1962 | Klar | 156/367 |
| 3,083,757 | 4/1963 | Kraft et al. | 156/515 |
| 3,108,034 | 10/1963 | Hannon | 156/582 |
| 3,258,385 | 6/1966 | Lake | 156/581 |
| 3,258,386 | 6/1966 | Blythe | 156/583 |
| 3,383,269 | 5/1968 | Kopp | 156/553 |
| 3,391,047 | 7/1968 | Kopp | 156/553 |
| 3,394,245 | 7/1968 | Waldrop . | |
| 3,449,196 | 6/1969 | Yumoto et a. | 156/498 |
| 3,474,952 | 10/1969 | Cover, Jr. et al. | 156/272 X |
| 3,527,632 | 9/1970 | Holes et al. | 156/271 |
| 3,540,970 | 11/1970 | Huntwork | 156/526 |
| 3,585,097 | 6/1971 | Beason | 156/582 |
| 3,759,772 | 9/1973 | Andersson | 156/270 |
| 3,953,272 | 4/1976 | Webber | 156/152 |
| 4,033,807 | 7/1977 | Neill et al. | 156/384 |
| 4,325,773 | 4/1982 | Schulz | 156/471 |
| 4,350,555 | 9/1982 | Popoff | 156/540 |
| 4,426,035 | 1/1984 | Dieckow | 206/526 |
| 4,451,320 | 5/1984 | Marvel | 156/366 |
| 4,461,661 | 7/1984 | Fabel | 156/70 |
| 4,540,458 | 9/1985 | Baughman et al. | 156/312 |
| 4,557,377 | 12/1985 | Maloney | 206/219 |
| 4,716,435 | 12/1987 | Wilson | 355/3 FU |
| 4,717,372 | 1/1988 | Herrington | 493/193 |
| 4,721,501 | 1/1988 | Herrington | 493/193 |
| 4,721,502 | 1/1988 | Herrington | 493/193 |
| 4,757,903 | 7/1988 | Edin | 271/225 X |
| 4,768,411 | 9/1988 | Su | 83/170 |

(List continued on next page.)

*Primary Examiner*—Curtis Mayes
*Attorney, Agent, or Firm*—Nixon & Vanderhye P. C.

[57] ABSTRACT

A vertical pressure sealing assembly is disclosed for sealing four edges of a business form. The assembly defines a business form path in a single vertical plane. The assembly includes two sealing modules each having a frame to support upper and lower sealing wheels. The sealing wheels are aligned with the outer edges of the business form. Each sealing module includes a first and second pair of upper/lower sealing wheels on each side of the module frame. The first frame is positioned vertically above and offset from the second sealing module. The second sealing module is orthogonal to the first module. A form chute between the two sealing modules is positioned immediately below the first sealing module and adjacent the second sealing module. Conveyor belts and drive wheels are used to move the business form through the vertical pressure sealing assembly.

8 Claims, 5 Drawing Sheets

U.S. PATENT DOCUMENTS 4,826,475 5/1989 Eweryd ..................................... 493/10
4,861,414 8/1989 Vogan ..................................... 156/530
4,919,738 4/1990 Ball et al. .............................. 156/73.5
4,961,302 10/1990 Davis ........................................ 53/451
5,019,203 5/1991 Singer .................................. 156/309.9
5,169,489 12/1992 Kalisiak et al. ........................ 156/555
5,308,436 5/1994 Walter et al. ........................ 156/441.5

VERTICAL PRESSURE SEALER APPARATUS

RELATED APPLICATIONS

Ser. No. 07/857,277, filed Mar. 25, 1992, now U.S. Pat. No. 5,290,385;

Ser. No. 07/417,775, filed Oct. 6, 1989, now U.S. Pat. No. 5,397,427;

Ser. No. 07/605,797, filed Oct. 31, 1990, now U.S. Pat. No. 5,540,806; and

Ser. No. 07/928,089, filed Aug. 13, 1992, now U.S. Pat. No. 5,527,416;

The complete subject matter of each of these related U.S. patent applications is incorporated by reference.

FIELD OF THE INVENTION

This invention relates to the field of the manufacture of business forms and the processing web manifolds having pressure sensitive adhesives.

BACKGROUND OF THE INVENTION

In the manufacture of business forms it is generally necessary to seal the forms using adhesives. The adhesives seal the various parts of the form together in a manifold suitable, for example, for mailing. The adhesive typically is sandwiched between two portions of a form that are folded together or that overlap.

In the prior art, heat or moisture has been used to activate the adhesives that seal business forms. Heat or moisture activated adhesives are generally undesirable in many business form processes because the activating heat or moisture can damage the form, erase or smudge ink printed on the forms, such as with a non-impact laser printer, and because the apparatus needed to apply heat and moisture to the adhesive is complex and difficult to maintain. Accordingly, there has been a need to avoid conventional heat or moisture activated adhesives. Alternatively, self-activated adhesives, such as those that are tacky to the touch, have been used to seal forms. Self-activated adhesives also have disadvantages. Because self-activated adhesives are tacky, they adhere to most surfaces against which they contact. A form having a self-activated adhesive will adhere to the processing equipment or to adjacent webs and tends to cause paper jams that stop the processing equipment. Accordingly, the tackiness of self-activating adhesives is a significant disadvantage in form processing equipment.

Pressure sensitive adhesives overcome many of the disadvantages of self-activated adhesives and adhesives activated by heat or moisture. Pressure sensitive adhesives are activated by relatively large pressures, such as 100 to 200 lbs. per lineal inch of paper width. Pressure sensitive adhesives are not tacky and do not adhere to surfaces until they are activated by large pressures. A significant advantage of pressure sensitive adhesives is that they can be applied to web stock used in the manufacture of business forms without any concern that these adhesives will prematurely adhere to adjacent web material or to equipment surfaces. Webs coated with strips of pressure sensitive adhesives can be stacked; transported in hot, cold and damp conditions; fed through forms handling equipment, such as rollers, impact printers and non-impact printers; perforated and cut without activating the adhesive. Pressure sensitive adhesives are only activated when subjected to a relatively large pressure that is substantially greater than any pressure that the web coated adhesive will normally experience. Accordingly, the activation of a pressure sensitive adhesive can be controlled to occur at the appropriate time and place in the form manufacture process by application of sufficient pressure to activate the adhesive.

Pressure sensitive adhesives have been used in business forms. Conventional pressure sealing apparatus for sealing multilayered business forms usually apply pressure to the entire web to activate the pressure sensitive adhesive strips on the form. Since the pressure required to activate the pressure sensitive adhesive is typically about 200 lbs. per lineal inch of paper width, a tremendous amount of force must be applied by these conventional devices to generate a pressure sufficient to activate the adhesive. Moreover, to ensure that the force applied by these conventional machines is uniformly distributed over the web area, the mechanical devices that apply the pressures to the webs must be extraordinarily rigid and have a smooth, uniform surface that contacts the web. In addition, the web surfaces must also be clean and smooth, so that the force applied by the mechanical devices is evenly distributed over the entire web and all portions of the web are subjected to the adhesive activating pressure. If the machine or web is not smooth and clean, then there may be portions of pressure sensitive adhesive on the web that are not subjected to pressure sufficient to activate the adhesive. If there is insufficient pressure, then portions of the adhesive will not be activated and will not adhere to the business form.

To overcome shortcomings in conventional pressure sealing devices, a class of devices has been developed which have been uniquely designed to apply adhesive-activating pressures to only those portions of a form in the vicinity of pressure activated adhesives. Several examples of these devices are described in the above-identified applications. These devices employ a variety of mechanisms, such as rollers, pinching rollers, slotted rollers, conveyor webs, and other devices, to selectively apply great pressure to predetermined portions of a business form. The claimed invention is a further improvement in this class of pressure sealing devices that selectively apply pressure to business forms to activate pressure activated adhesives.

SUMMARY OF THE INVENTION

The current invention is a vertical pressure sealing device that selectively applies pressure to the outer edges of a business form. The invention, in one embodiment, comprises a pair of sealer modules arranged such that the sealing wheels in both modules are all aligned about a single vertical plane. The path of the business form is in this vertical plane through the sealing device. The first of the pair of sealing modules is elevated above the second module, and the second module is orthogonal to the first module.

The first sealing module may include a frame having at least one pair of upper/lower pinching wheels on each of opposite sides of the frame, and the pinching wheels are horizontally aligned. In each pair of pinching wheels, one of the wheels may be geared to a spline shaft or other power providing device and the other wheel may be forcefully biased against the first wheel by a force equal to or greater than that needed to activate the pressure sealing adhesives on the form. Instead of only one pair of pinching wheels on each side of the frame, there may be two pair or more of pinching wheels. The second sealing module is similar to the first module, but oriented to be orthogonal to the first module in that opposite pairs of pinching wheels are aligned vertically rather than horizontally as in the first sealing module.

Between the pair of sealing modules is a vertical chute that guides a business form from the first module to the second module. The chute may include an optical sensor that detects a business form in the chute and activates a solenoid that moves the business form from the chute into the second sealing module. Instead of a sensor and a solenoid, the vertical chute may be tilted slightly downward towards the second sealing module to facilitate movement of the form.

In operation, a business form ready for sealing is dropped vertically into the first sealing module. The pair of vertical opposite edges on the form are inserted between the pair of pinching wheels of the first module. As these form edges slide between the pinching wheels, the edges are subjected to relatively great pressures that activate edge strips of pressure activate adhesives. The activated adhesives seal these opposite vertical edges of the form.

After passing through the first sealing module, the partially sealed business form drops into the vertical chute. If the chute has a sensor, then the form is detected and a sensor activated solenoid moves a wheel that causes the form to slide towards the second sealing module. In the second module, the opposite horizontal edges (top and bottom edges) of the form slide between the pair(s) of pinching wheels. These horizontal edges are coated with strips of pressure activated adhesive between the two or more layers of the business form. The pressure applied by the pinching wheels activates these adhesive strips to seal the form along its horizontal edges. Upon leaving the second sealing module, the business form is completely sealed along its four edges.

DETAILED DESCRIPTION OF THE DRAWINGS

Figure 1:
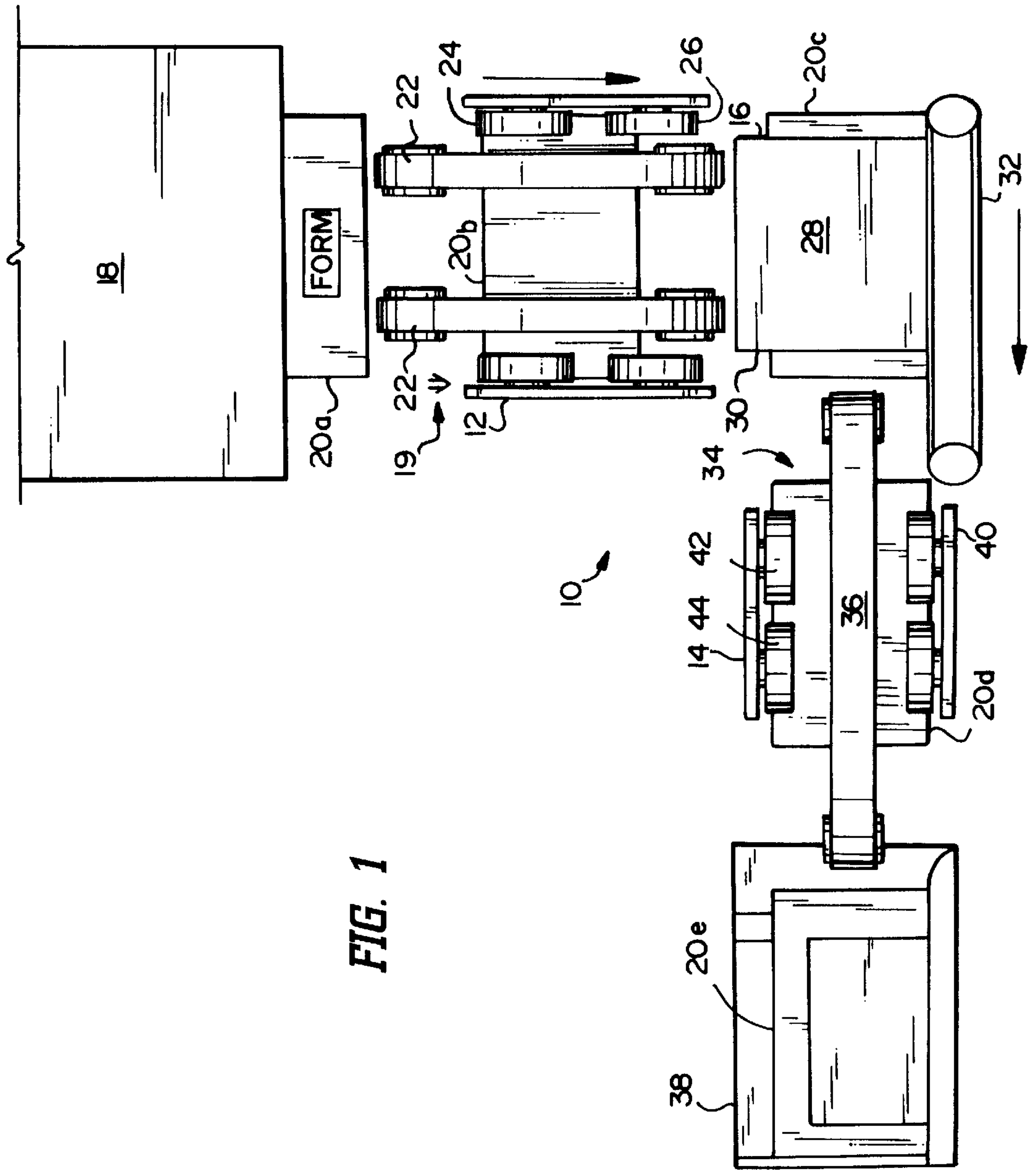
FIG. 1 is a front schematic view of one embodiment of the invention.
Figure 2:
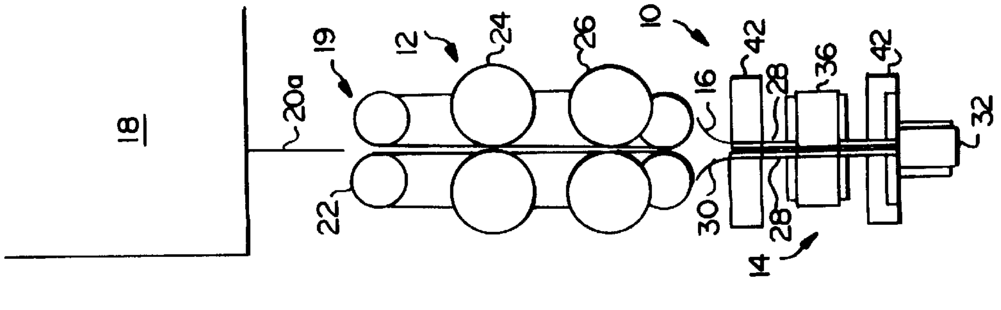
FIG. 2 is a side schematic view of the embodiment of the invention shown in FIG. 1.

FIGS. 1 and 2 show a schematic view of a preferred embodiment of the invention which is a vertical pressure sealer 10. The pressure sealer includes a first sealing module 12 and a second sealing module 14. A chute 16 is located between the two sealing modules.

Figure 3:
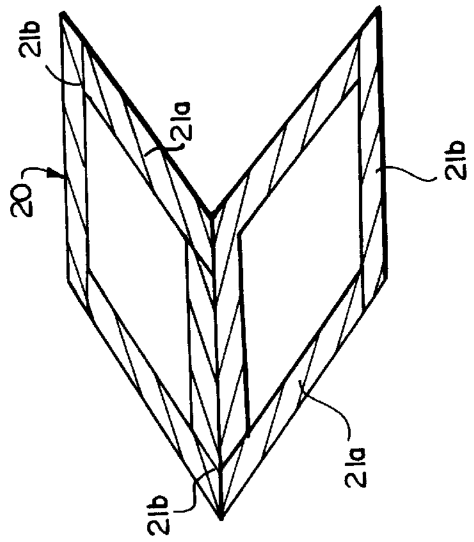
FIG. 3 is a perspective view of a business form in a partially-unfolded state.

A conventional form folder machine 18 may be positioned at the form inlet 19 of the first sealer. Business forms 20*a* (letters a to e refer to the position of the form 20 in the machine) that have been folded and are ready for sealing pass from the folder machine to the inlet 19 of the first sealer. An example of a business form 20 is shown in an unfolded state in FIG. 3. The business form as shown is a single web that has been folded in half. Pressure sensitive adhesive strips 21*a, b* have been applied to edge strips along all four edges of the form. The form may, in other embodiments, be a multi-web form in which a number of webs are overlapped and sealed in a business form. Alternatively, the form may be folded with a C-fold or Z-fold, instead of the center fold form shown in FIG. 3. In addition, the form may include inserts, such as a return envelope. A wide variety of business forms are suitable for being sealed with the vertical pressure seal described herein.

At the inlet to the vertical pressure sealer, two sets of pairs of opposing conveyor belts 22 grasp the folded form 20 between each belt pair and move the form through the first sealing module 12. The opposing conveyor belts are positioned vertically and provide a business form path between opposing belts that is aligned with the sealing module.

As the form 20*b* moves through the first sealer module, the edges of the form 21*a* (FIG. 3) are pinched by the forward and rear sealing wheel assemblies 24, 26, respectively, of the first sealing module. Each sealing wheel assembly comprises upper and lower sealing wheels that share a common tangent in the plane of the path of the business form. These sealing wheel assemblies compress the edges of forms that pass between the wheels. The force applied by the sealing wheel assembly to the edges of the forms is equal to or greater than the threshold sealing pressure, e.g., 100 to 200 lbs. per lineal inch, necessary to activate the pressure sensitive adhesive strips 21*a,* 21*b* within the forms. The adhesive strips 21*a* are located along the edges of the form such that the strips are directly between the sealing wheel assemblies 24, 26 when the form passes through the first sealing module. These adhesive strips are formed of pressure sensitive adhesives and become tacky only after sufficient pressure to activate the adhesive has been applied to the strips by the sealing wheels of the sealing modules.

Once the form 20*b* passes through the first sealing module 12, the activated pressure sensitive adhesive strips 21*a* seal the two opposing vertical edges of the business form. The conveyor belts 22 move the form vertically downward from the first sealing module and into a chute 16 positioned immediately below the outlet of the first sealing module. The chute receives the form 20*c* between a pair of planer chute side walls 28. These side walls are oriented vertically and separated by a short distance that is sufficiently greater than the width of a folded form to allow the form to pass through the chute without undue resistance in the chute. The opposing side walls 28 of the chute bow outwardly at their top to form a wide-mouth inlet 30 to the chute to receive the forms dropping vertically from the first pressure sealer module.

The bottom of the chute is also open to allow the bottom edge of each form to extend below the chute slot and ride on a narrow conveyor belt 32 below the chute. The conveyor belt 32 moves the form 20*c* from the chute to the inlet 34 of the second sealing module 14. At the end of the chute conveyor belt, the form is grasped between a pair of conveyor belts 36 for the second sealing module. These conveyor belts 36 are oriented horizontally and are coaxial to the second sealing module. The conveyor belts move the form 20*d* from the chute, through the second sealing module and into a hopper 38 that temporarily stores fully sealed business forms 20*e*. Each of the conveyor belts 36, 32 and 22, may be a conventional traction belt seated around a pair of belt wheels, where a first wheel is powered and drives the belt, and a second wheel, at the opposite end of the conveyor, is a follower wheel.

The second sealing module is similar in construction to the first module. As does the first module, the second module includes a frame 40 that, in the preferred embodiment, supports two pairs 42, 44 of opposing sealing wheel assemblies located on either side of the module. As the form 20*d* passes through the second sealing module, two edges of the form are pinched between each of the pairs of sealing wheels. These sealing wheels apply pressure to the edges of the form that is sufficient to activate the adhesive strips 21*b* on the form edges between the sealing wheels of the second module. Once the adhesive is activated, the strips 21*b* seal the corresponding edges of the form to completely seal the form. The completely-sealed form is moved from the second sealing module to the hopper for further processing.

Figure 4:
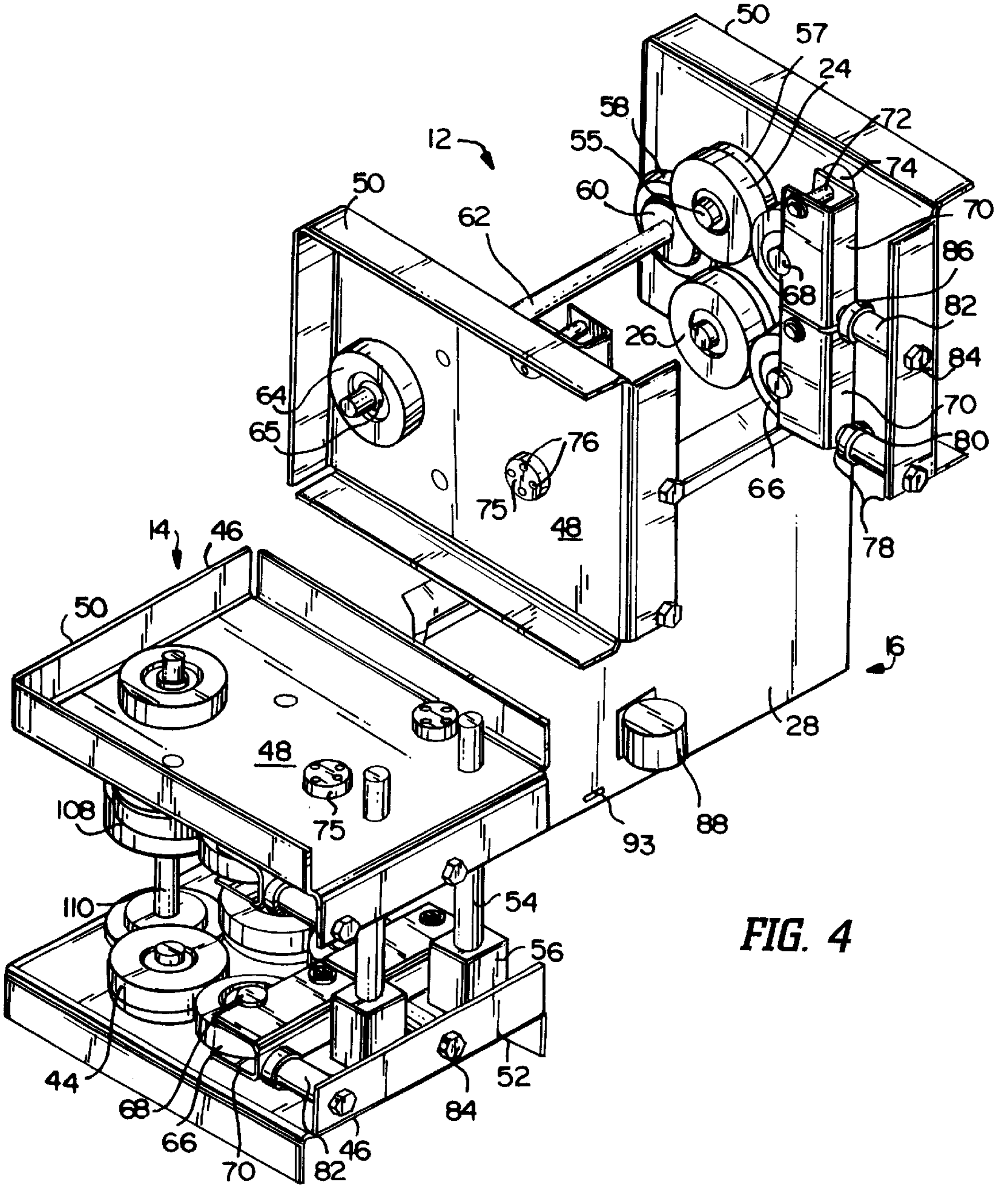
FIG. 4 is a perspective view of another embodiment of the invention.
Figure 5:
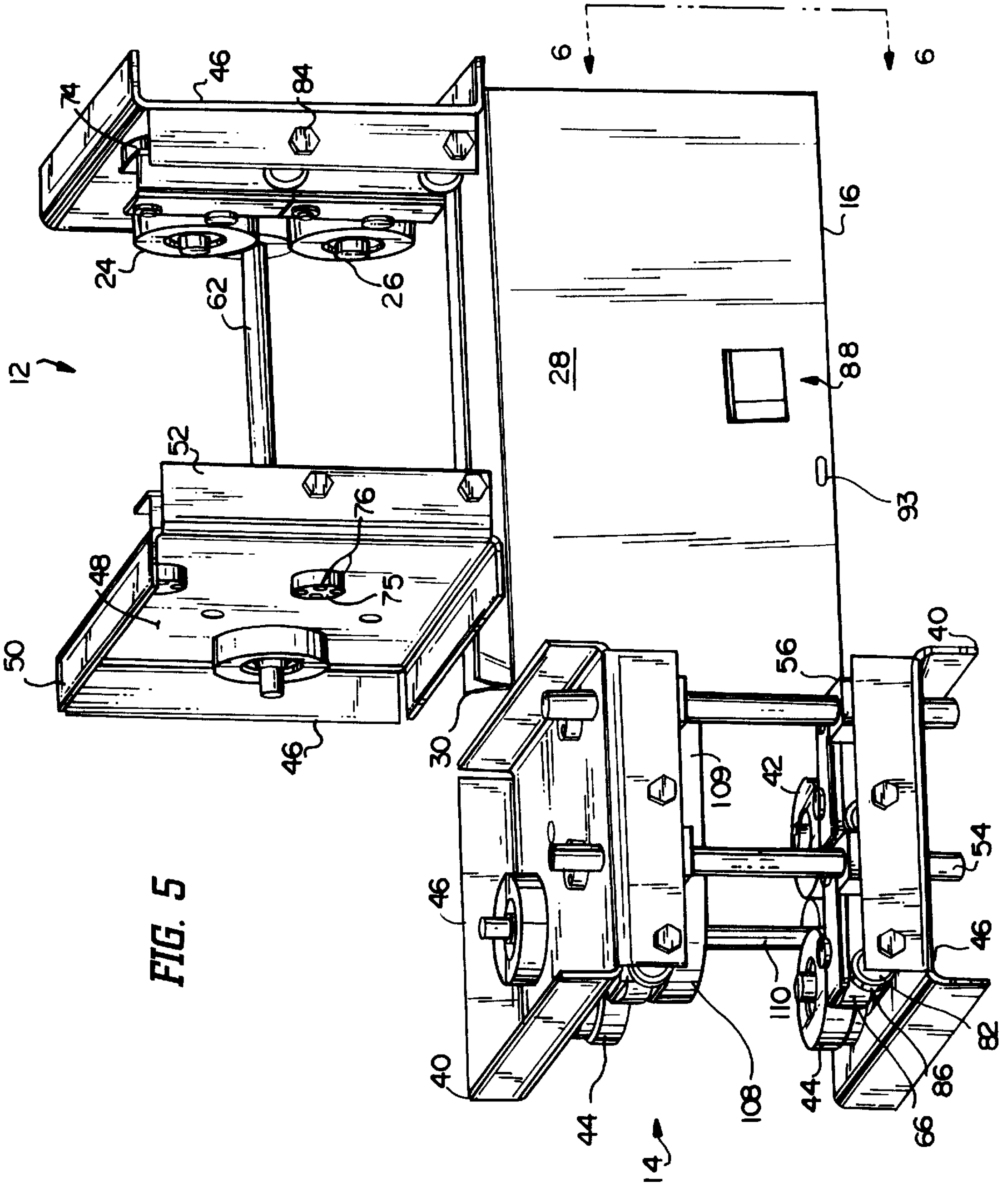
FIG. 5 is a side view of the embodiment shown in FIG. 4.

FIGS. 4 and 5 show in great detail a second preferred embodiment of the first and second sealing modules and chute. The first and second sealing modules 12, 14, are substantially identical in structure, except for the spacing between their frame walls. The frame wall spacing for the first sealing module is to accommodate the width of the form, and, for the second sealing module, to accommodate the height of the form. The spacing between the frame walls of each sealing module is set such that the sealing wheel assemblies 24, 26, 42, 44, are aligned with the edges of the business form. The frame walls 46 may have a squarish planer portion 48 (rear support plate) with straight edges 50 on three sides folded outward for structural rigidity and a fourth edge 52 folded inward to provide a support mount for other apparatus, e.g., pressure spring, in the sealing modules.

The opposing frame walls 48 are held in a fixed separation by a pair of columns 54 that extend between and perpendicular to the walls. The columns may include a threaded portion that protrudes through the frame wall and engages a threaded hole in a block bushing 56 fixed to the frame wall. Alternately, the columns may be smooth, and the bushings 56 may include a threaded hole in one wall to accept a threaded fastener to lock the column in place. A similar arrangement of columns and bushings between the frame walls may be used in the first sealing module. As in the second module, the distance between the frame walls in the first module may be changed by adjusting the bushings on the columns.

The lower sealing wheels of the sealing wheel assemblies 24, 26, 42, 44 in both of the sealing modules are rotatably mounted to the frame walls 48 of each module. The lower sealing wheels may be mounted with ball bearings to a fixed stub shaft 55 extending perpendicular from the frame wall. Each metal pressure sealing wheel has a smooth outer cylindrical surface for applying a uniform pressure across the width of the wheel to the edges of the business forms. Each lower sealing wheel has a fixed and corresponding follower gear wheel 57. The gear teeth of each follower gear wheel engage the gear teeth of a drive gear wheel 58. The drive gear is a recessed-action driver gear, but may also be a spur gear having the same size as the follower gears.

Each driving gear is mounted on a hub 60 that slides onto a spline shaft 62. Each sealing module has a spline shaft that extends perpendicularly through the frame walls and through both driving gears. The spline shaft operatively connects the sealing wheels on both sides of the module and causes the wheels to turn at identical speeds. The hubs 60 for the spline shaft are rotatable mounted to the frame walls with a bearing housing 64 and bearing 65. A power source (not shown) is applied to rotate the spline shafts and thereby turn the driving gears that turn the lower sealing wheels.

There is a corresponding upper sealing wheel 66 for each lower sealing wheel in each sealing wheel assembly. Each upper sealing wheel is forcibly pressed against its corresponding lower sealing wheel such that the pressure at the contact area between the upper and lower sealing wheels is sufficient to activate the pressure sealing adhesives used in the business forms. The pressure in the contact area between the upper and lower sealing forces is typically in the range of 100 to 200 pounds per lineal inch. The upper sealing wheels are not driven and are mounted on a hub 68 with ball bearings. The hubs rest in half-circle mounts on the edges of the flanges of a channel bracket 70.

The channel bracket is pivotally attached to the frame wall 48. Each channel bracket has at one end an upper sealing wheel and at the other end a pair of opposing apertures through which extends a stud 72 that attaches the channel bracket to the frame wall 48. The channel bracket and upper sealing wheel pivot about the stud with respect to the frame wall and in a plane substantially perpendicular to the path of the business form. The stud mounting 74 of the stud to the frame wall is adjustable so that the orientation, e.g., caster and toe-in, of the upper sealing wheel can be set to adjust the wheel track of the upper sealing wheel as it rides across the form edges. The stud shaft extends beyond the mounting 74 and terminates in a rounded end. This rounded end rests against the frame wall 48. Against the back side of the frame wall is a backer plate 75 with four holes for four threaded fasteners 76. All four fasteners 76 extend through the backer plate 75, through the frame wall 48, and into the four threaded holes in the stud mounting 74. By adjusting the relative tightness of the four fasteners 76, the stud 72 is pivoted on its rounded end against the frame wall 48. The stud 72 is thereby moved in whatever direction desired to adjust the toe-in and caster of the upper sealing wheels 66 so the wheel rim surfaces ride flat against the business form edges. The stud 72 is only moved during this adjustment. The stud remains stationary during normal machine operation.

Each upper sealing wheel is forced against its lower sealing wheel by a pressure spring assembly 78. A threaded rod with a rounded nipple 80 on one end and a grippable head (hexagonal in this embodiment) 84 on the other extends through a hole in the frame wall edge 52. The nipple is set into a receiving hole on the end of the channel bracket opposite the stud 72. Mounted on the threaded rod are a compressive spring 82 below the frame wall edge 52, and an internally threaded adjustment nut 86 below the compressive spring. The adjustment nut 86 is coaxial and adjacent the compressive spring to permit manual setting of the spring force applied by the pressure spring assembly to the upper sealing wheel. The pressure spring assembly is adjusted such that the desired adhesive activating sealing pressure is applied between the upper and lower sealing wheels to the edges of the business forms. One example of a pressure spring assembly is shown in related, commonly-assigned U.S. patent application Ser. No. 07/605,797, entitled "Table Top Pressure Sealer," which is incorporated by reference.

Figure 6:
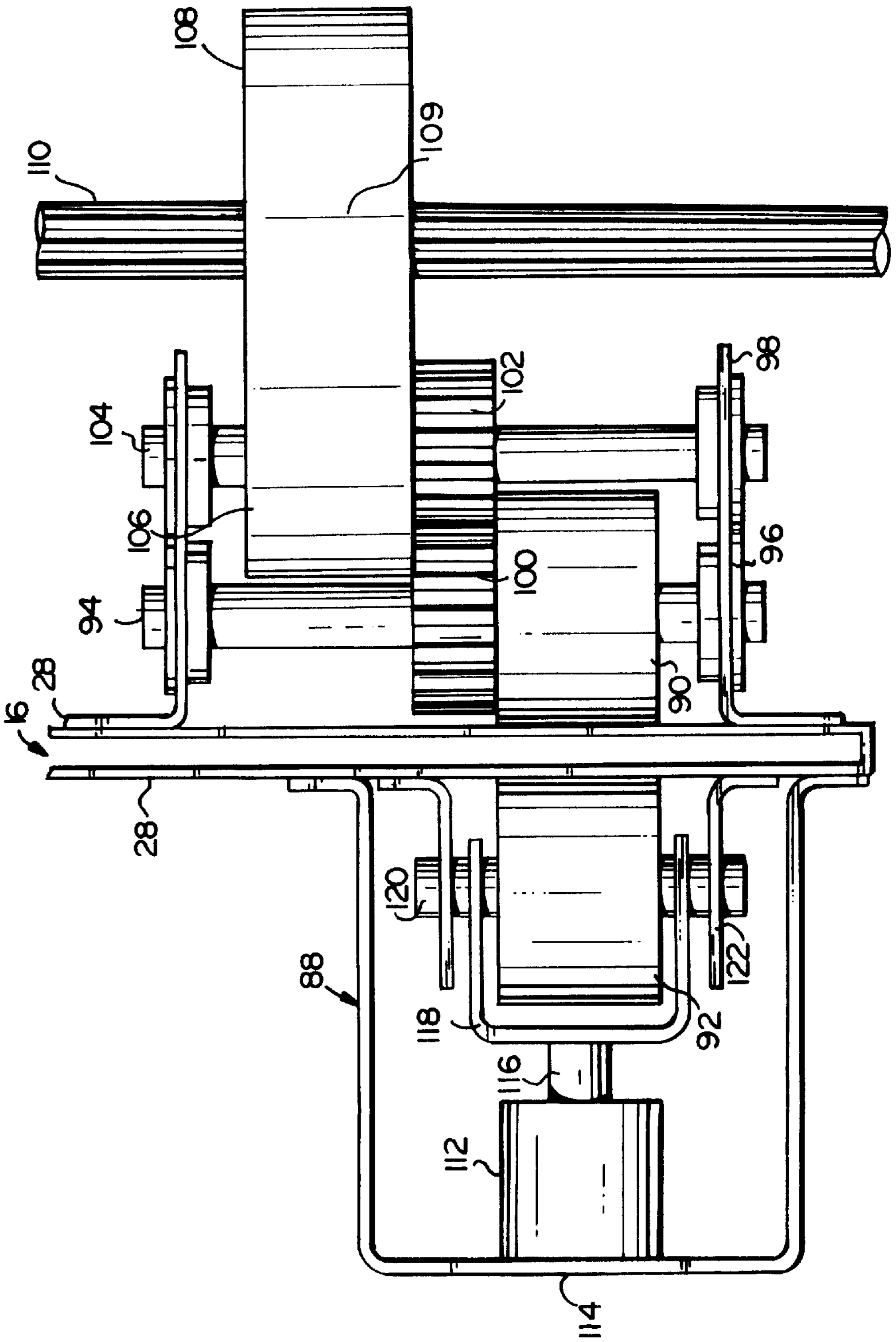
FIG. 6 is an end view along line 6-6 in FIG. 5.

The chute 16 of the embodiment shown in FIG. 4 includes a motorized chute wheel assembly 88 that moves the business forms from the chute to the second sealing module 14. The chute wheel assembly is an alternative to the chute conveyor belt 32 shown in FIGS. 1 and 2. The chute wheel assembly is shown in detail in FIGS. 4 to 6. The assembly includes a drive wheel 90 and a follower wheel 92, both of which have rubberized traction surfaces that move business forms through the chute without damage. The outer rim of the drive wheel is tangential to the inside surface of a wall 28 of the chute.

The drive wheel is constantly spinning, but does not itself sufficiently engage a form to push the form through the chute. To move a form through the chute, a follower wheel 92 is moved by a solenoid 112 into engagement with a business form to pinch the form between the follower and drive wheels. When the follower wheel moves against the form, it displaces the form against the drive wheel such that the friction between the drive wheel and follower wheel is sufficient to push the form through the chute. A sensor, e.g., electric eye (93), detects a business form in the chute and activates the solenoid that moves the follower wheel against the form. After the form is through the chute, the solenoid retracts the follower wheel so that another form may drop into the chute without catching on the follower wheel.

The drive wheel for the chute is mounted on a shaft 94 that is supported by bearings 96 to a bracket 98 attached to a chute wall 28. A spur gear 100 is fixed to the drive wheel shaft and a drive gear 102 on a parallel shaft 104 that is also bearing mounted on bracket 98. The parallel shaft 104 includes a large pulley 106 that is turned by a pulley 108 on a drive spline 110 via a belt 109. By this gearing arrangement the rotational speed of the drive wheel can be increased above that of the drive spline.

The follower wheel 92 on the side of the chute 16 opposite to the drive wheel is not powered as is the drive wheel. The follower wheel is pressed against the business form and drive wheel by a solenoid 112 that is mounted in a housing 114 attached to the chute wall 28. The solenoid 112 includes a plunger 116 that reciprocally moves the U-shaped bracket 118 for the follower wheel 92. The shaft 120 for the follower wheel is held in the U-bracket and slides in a slotted bracket 122 attached to the chute wall. Accordingly, the follower wheel moves in and out of the chute slot to engage a business form in the chute.

The invention has been described in connection with its preferred embodiments. The invention is not limited to these embodiments, but, rather, encompasses any modifications or alterations that fall within the meaning and spirit of the following claims.

We claim:

1. A vertical pressure sealing assembly comprising:

a first pressure sealing module having two pairs of first upper and lower forward sealing wheels and two pairs of first upper and lower rear sealing wheels, wherein the pairs of first upper and lower forward sealing wheels are in substantial horizontal alignment and the pairs of first upper and lower rear sealing wheels are in substantial horizontal alignment, said sealing wheels each being tangent to a common vertical plane at a nip point between each of said pairs of sealing wheels, and said wheels biased together by a force sufficient to apply an adhesive activating pressure between said wheels;

a chute vertically below said first pressure sealing module, said chute having a chute slot defined by a pair of adjacent chute walls, said chute slot being in said common vertical plane, and a second pressure sealing module having two pairs of second upper and lower forward sealing wheels and two pairs of second rear sealing wheels, wherein the pairs of second upper and lower forward sealing wheels are in substantial vertical alignment and the pairs of second upper and lower forward sealing wheels are in substantial vertical alignment, and said sealing wheels each being tangent to said common vertical plane at a nip point between each of said pairs of sealing wheels.

2. A vertical pressure sealing device as in claim 1 wherein said first sealing module further comprises a frame having a first wall and a second wall, said walls are aligned vertically and horizontally separated by a distance slightly greater than the width of a preselected business form, a first drive wheel in said pairs of sealing wheels is rotatably mounted to said first wall and a second drive wheel in said pairs of upper and lower sealing wheels is rotatably mounted to said second wall.

3. A vertical pressure sealing device as in claim 2 wherein on each of said walls of said first sealing module is mounted:

an upper sealing wheel bracket rotatably supporting said upper sealing wheel, said bracket pivotally attached to said wall;

a pressure spring assembly fixed to said frame and biased against said bracket such that said upper sealing wheel is forced against said lower sealing wheel by a pressure spring force at least equal to a pressure sealing adhesive activating force, and a drive gear in rotating engagement with said lower sealing wheel.

4. A vertical pressure sealing assembly as in claim 1 further comprising a vertical conveyor aligned with said sealing wheels in the first sealing module, and a horizontal conveyor aligned with said sealing wheels in the second sealing module.

5. A vertical pressure sealing assembly as in claim 4 further comprising a horizontal conveyor immediately below and adjacent said chute slot.

6. A vertical pressure sealing device comprising:

a first pressure sealing module having two pairs of first upper and lower sealing wheels wherein each pair is in substantial horizontal alignment, said first upper and lower sealing wheels each being tangent to a common vertical plane at a nip point between each of said pairs of sealing wheels, and said wheels biased together by a force sufficient to apply an adhesive activating pressure between said wheels;

a chute vertically below said first pressure sealing module, said chute having a chute slot defined by a pair of adjacent chute walls, said chute slot being in said common vertical plane, and a second pressure sealing module having two pairs of second upper and lower sealing wheels wherein each pair is in substantial vertical alignment, and said second upper and lower sealing wheels each being tangent to said common vertical plane at a nip point between each of said pairs of sealing wheels;

wherein said first sealing module further comprises a frame having a first wall and a second wall, said walls are aligned vertically and horizontally separated by a distance slightly greater than the width of a preselected business form, a first of said pairs of upper and lower sealing wheels is rotatably mounted to said first wall and a second of said pairs of upper and lower sealing wheels is rotatably mounted to said second wall;

further wherein on each of said walls of said first sealing module is mounted;

an upper sealing wheel bracket rotatably supporting said upper sealing wheel, said bracket pivotally attached to said wall;

a pressure spring assembly fixed to said frame and biased against said bracket such that said upper sealing wheel is forced against said lower sealing wheel by a pressure spring force at least equal to a pressure sealing adhesive activating force, and a drive gear in rotating engagement with said lower sealing wheel; and further wherein said upper sealing bracket is pivotally attached to said frame wall by a stud extending substantially perpendicularly through said bracket and against said frame wall including a rounded stud head pivotally engaging said frame wall, said stud head receiving a plurality of adjustable fasteners extending through both a backer plate and said frame wall, said adjustable fasteners setting the orientation of the stud with respect to the wall.

7. A vertical pressure sealing assembly comprising:

a first pressure sealing module having two pair of upper and lower first sealing wheels wherein each pair of wheels is in substantial horizontal alignment and each wheel is tangent to a common vertical plane at a nip point between each pair of wheels, and said wheels being biased together by a force sufficient to apply an adhesive activating pressure between said wheels;

a chute vertically below said first pressure sealing module, said chute having a chute slot defined by a pair of adjacent chute walls, said chute slot being in said common vertical plane, and a second pressure sealing module having two pair of upper and lower second sealing wheels wherein each pair of wheels is in substantial vertical alignment and each wheel is tangent to said common vertical plane at a nip point between each pair of wheels, said second sealing wheels in said second pressure sealing module further comprising a vertical conveyor aligned with said first sealing wheels in the first sealing module, and a horizontal conveyor aligned with said sealing wheels in the second sealing module;

and said assembly further comprising a drive wheel assembly associated with said chute, said drive wheel assembly comprising:

a drive wheel rotating about a vertical axis and substantially tangent to a first of said chute walls, said first wall having an aperture receiving said drive wheel;

a follower wheel aligned horizontally with said drive wheel and said follower wheel rotating about a vertical axis in a plane including said vertical axis to said drive wheel and normal to said chute slot, said follower wheel reciprocally extending through an aperture in a second of said chute walls, and a solenoid having a plunger attached to said slidable follower wheel and reciprocally moving said follower wheel in and out of said chute slot.

8. A vertical pressure sealing assembly as in claim 7 further comprising a sensor detecting the presence of a business form in said chute slot, and said sensor activating said solenoid when a business form is detected in said chute slot, said solenoid when activated sliding said follower wheel into said chute slot.

* * * * *